(No Model.)

F. E. BENSON.
ANIMAL POKE.

No. 354,676. Patented Dec. 21, 1886.

WITNESSES:

INVENTOR:
F. E. Benson
BY Munn & Co
ATTORNEYS.

UNITED STATES PATENT OFFICE.

FINLEY E. BENSON, OF LAKE PARK, IOWA.

ANIMAL-POKE.

SPECIFICATION forming part of Letters Patent No. 354,676, dated December 21, 1886.

Application filed October 1, 1886. Serial No. 215,086. (No model.)

*To all whom it may concern:*

Be it known that I, FINLEY E. BENSON, of Lake Park, in the county of Dickinson and State of Iowa, have invented a new and Improved Animal-Poke, of which the following is a specification, reference being had to the annexed drawings, forming a part thereof, in which—

Figure 1:
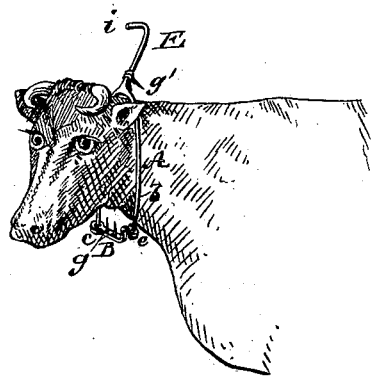
Figure 2:
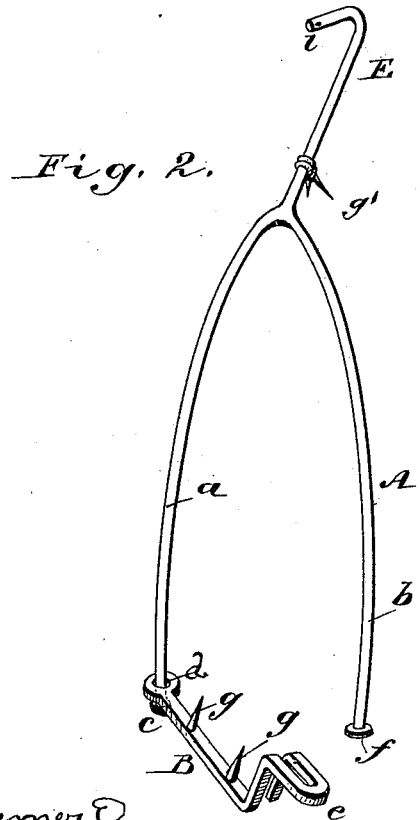

Figure 1 is a perspective view showing the poke in use, and Fig. 2 is an enlarged perspective view showing the poke open ready for application to the neck of the animal.

Similar letters of reference indicate corresponding parts in both views.

My invention relates to improvements in that class of animal-pokes which are designed to prevent the animal from spreading apart the wires of a fence when attempting to pass through the fence; and it consists in the peculiar construction and arrangement of parts, as hereinafter fully described, and pointed out in the claims.

The body of the poke is formed of the rod A, bent into a U-shaped loop, with two approximately parallel arms, $a$ $b$. The arm $a$ is provided with a head, $c$, and an eye, $d$, formed on the end of the bar B, is received on the arm $a$ above the head $c$. The free extremity of the bar B is doubled or returned upon itself, forming the loop $e$, which is bent twice at right angles or offset, as shown in the drawings. The end of the arm $b$ is provided with a head, $f$, which retains the bar B in place when the arm $b$ is received in the loop $e$. The bar B is provided with barbs $g$, projecting inward. The curved extremity of the loop A is provided with an arm, E, having upon the end thereof an outwardly-projecting hook, $i$. Barbs $g'$ project from the back of the arm E near the loop A.

The poke is placed upon the neck of the animal by slipping the loop A over the neck and afterward bringing the loop $e$ into engagement with the end of the arm $b$. When the animal approaches a fence, the hook $i$ will engage the wire or rail of the fence and tilt the poke, so as to cause the barbs $g$ or $g'$ to prick the neck of the animal.

Having thus fully described my invention, I claim as new and desire to secure by Letters Patent—

1. An improved animal-poke consisting of a U-shaped loop provided with an arm at its curved extremity, having a forwardly-projecting hook and provided with a barb, and a bar pivoted to the lower end of one arm of the U-shaped loop, and provided with a loop for engaging the other arm of the said loop, substantially as herein shown and described.

2. The herein-described animal-poke, consisting of the U-shaped loop A, having heads $c$ $f$ on its arms and provided with the arm E, having the hook $i$ and barb $g'$, and the bar B, having an eye in one end to receive one arm of the U-shaped loop, and provided with the loop $e$ at the other end to receive the other arm of the said loop, as specified.

FINLEY E. BENSON.

Witnesses:
H. P. WOOD,
C. S. WOOD.